2 Sheets—Sheet 1.
W. F. COCHRANE.
HARVESTER.
No. 46,181. Patented Jan. 31, 1865.
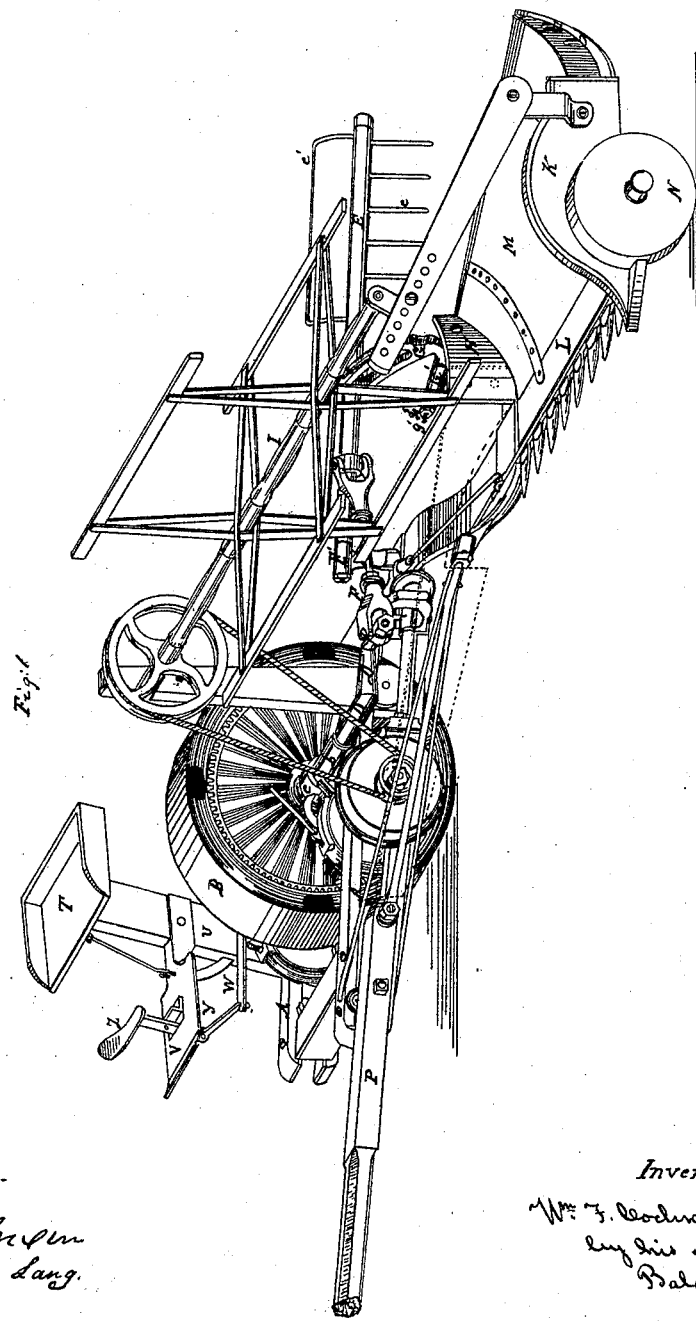
Witnesses.
Inventor.

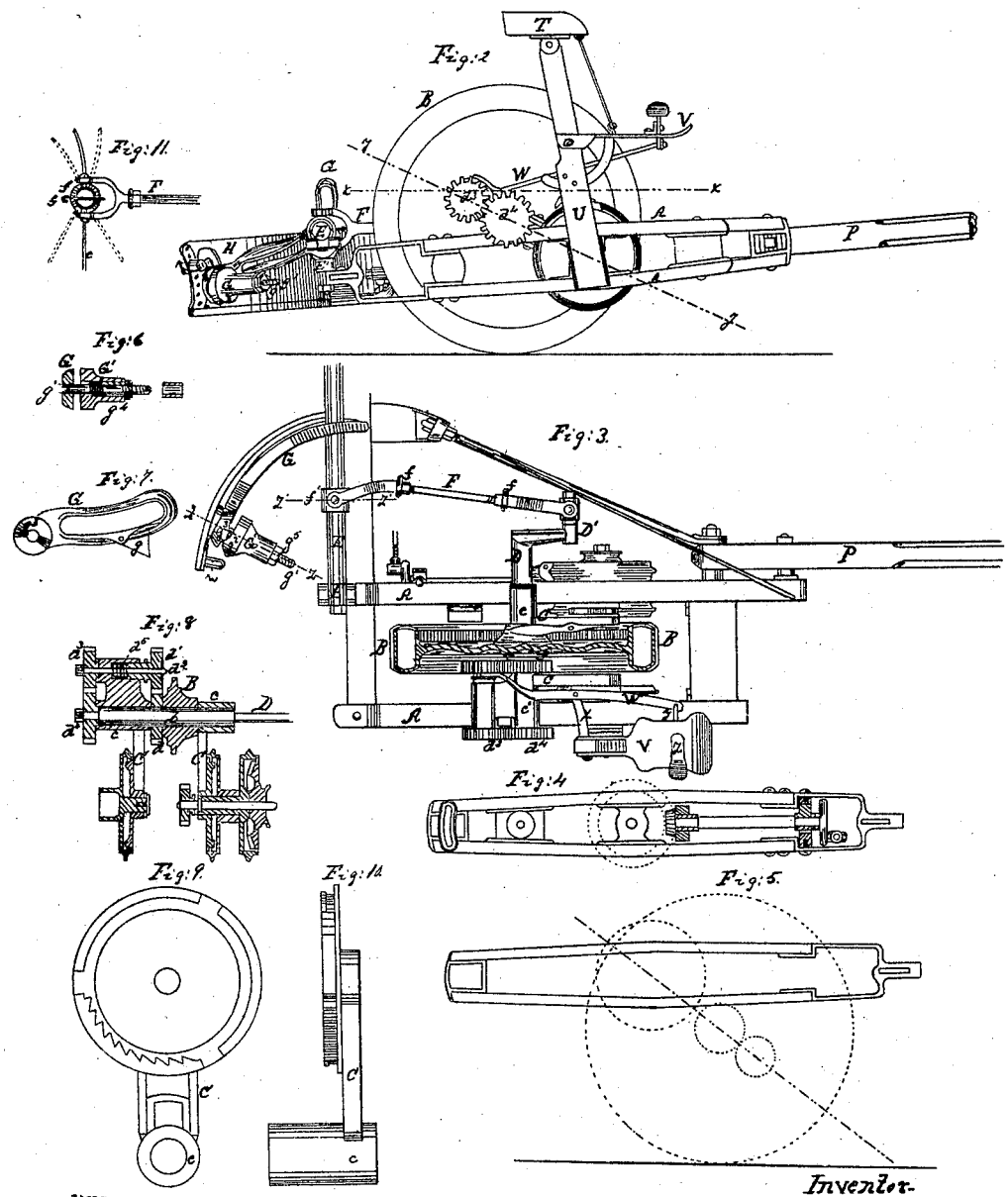

UNITED STATES PATENT OFFICE.

WM. F. COCHRANE, OF SPRINGFIELD, OHIO, ASSIGNOR TO HIMSELF AND WARDER & CHILD, OF SAME PLACE.

IMPROVEMENT IN HARVESTERS.

Specification forming part of Letters Patent No. 46,181, dated January 31, 1865.

*To all whom it may concern:*

Be it known that I, WILLIAM F. COCHRANE, of Springfield, in the county of Clarke and State of Ohio, have invented a new and useful Improvement in Harvesters, of which the following is a full, clear, and exact description, reference being had to the accompanying drawings, which make part of this specification, and in which—

Figure 1 represents a view in perspective of a harvester embracing my improvements. Fig. 2 represents a view in elevation of the gearing side of the same. Fig. 3 represents a plan or top view of a portion of the same, with the driving-wheel in section at the line $x\ x$ of Fig. 2. Fig. 4 represents a view, partly in section, of the inner side of the gearing-frame as seen from the divider side of the machine. Fig. 5 is a diagram showing the vertical range of motion of which the machine is capable, the rake-gears being shown below the frame, but in a position the reverse of that shown in Fig. 2. Fig. 6 represents a longitudinal central section through the friction-brake and rake-guide at the line $z\ z$ of Fig. 3. Fig. 7 represents a view of the rake-guide. Fig. 8 represents a transverse section through the driving and rake gearing at the line $y\ y$ of Fig. 2. Figs. 9 and 10 represent views of the pipe-boxes, radius-bars, and disks, which connect the main frame and driving-wheel; and Fig. 11 represents a view of the rake, partly in section, at the line $z'\ z'$ of Fig. 3, showing the details of the device for varying the angle of the rake-teeth.

The improvement herein claimed consists, first, in a pivoted slotted link or guide for controlling the movements of an automatic rake; secondly, in combining with a pivoted slotted link a latch regulator or valve which alternately automatically retains and releases the rake-arm; thirdly, in a device for varying the angle at which the teeth of the rake strike the platform; fourthly, in a device for varying the path described by the rake; fifthly, in a device which regulates the force with which the rake drops upon the platform, and also holds the rake down upon the gavels when raking off; sixthly, in a device for driving the rake from the outer or stubble side of the driving-wheel; seventhly, in a device for varying the size of the gavels; eighthly, in a tension-brake to control the force with which the rake-teeth strike the platform.

In the accompanying drawings, which exemplify one mode of carrying out the objects of my invention, a suitable main or gearing frame, A, is shown as supported by a driving-wheel, B, mounted and turning a tube or sleeve, $b$, Fig. 8.

Radius-bars C are rigidly secured to sleeves or collars $c\ c'$, to which the tube $b$ is fastened. These radius-bars are pivoted to the frame, so as to turn freely in their sockets, by means of disks C' and shell-brackets C², as shown in the drawings, or in some other suitable way. They must likewise be provided with suitable detents to hold the frame at the desired elevation above the ground.

A shaft, D, revolves within the tube $b$, and carries a crank-arm, D', on the end next the platform. A rake arm or stall, E, is pivoted in a swiveling bearing or turning post, E', in such manner as to leave it free to play vertically, horizontally, and on its axis, and is provided with teeth $e$, inserted into it at right angles, and a screw, $e'$, to separate the falling grain from that already on the platform.

The rake is connected by the pitman F to the crank-arm D', the pitman being so pivoted both to the crank and rake arm as to allow it free play in the directions required.

A spur-wheel, D, on the hub of the driving-wheel, or on the tube $b$, drives a corresponding pinion, $d'$, on a counter-shaft, $d^2$, which carries another pinion, $d^3$, meshing into a pinion, $d^4$, on the crank-shaft D, thus giving motion to the rake. By this means I am likewise enabled to vary the speed of the rake, or the number of its vibrations relative to a given number of revolutions of the driving-wheel, by altering the number of teeth and the relative size of the two pinions $d^3\ d^4$, it being obvious that by increasing the number of teeth in the pinion $d^3$ and diminishing the number of those in $d^4$ the shaft D will be driven at an increased speed, and vice versa. This could not of course be done were the rake driven directly from the driving-axle $b$ without the intervention of gearing, as it could then make only one reciprocation of the rake to every revolution of the driving-wheel.

The rake is thrown out of gear by sliding the pinion $d'$ endwise on its shaft, which releases a pin on the shaft, which takes into a recess in the pinion; or a common clutch and feather may be used. A spiral spring, $d^5$, Fig.

8, throws the rake into gear whenever released by the driver.

The pitman F is made in three parts, the central one screwing into the others by means of nuts $f$, so that the length of the pitman may be varied in order to cause the rake to strike farther forward or back, or to accommodate it to the height at which the machine is cutting.

The socket $f'$, through which the rake passes, is pivoted to play freely horizontally in the jaws of the pitman, and is secured to the rake by a pin, $f^2$, passing through one of a series of holes in the rake and a corresponding hole in the socket. By this means the angle of the rake-teeth relative to the platform can be varied at will, as shown in Fig. 11, the rake-staff having a motion around its axis for that purpose.

The movements of the rake are controlled by a slotted guide or link, G, curved as shown in the drawings, and pivoted at its lower end to the inner guide-rail, H, of the platform. This guide embraces the rake-stale, and is provided with an automatic gravitating valve-latch or gate, $g$, which is pivoted at one end and plays freely vertically in a slot in the guide. When the rake is moving forward, the latch by its own weight drops behind the rake and holds it in the upper part of the link, while when the rake drops and begins to retract it falls out of the link, as shown in Fig. 7, so as to leave the rake free to travel backward in the slot.

In order to prevent the rake-teeth from striking upon the platform with such force as to injure them and to hold them down upon the grain when raking off, I pivot the link on an arm, $g'$, on which a sleeve, G', plays. This sleeve has on its inner end a cam-face, $g^2$, rubbing against a corresponding face, $g^3$, on the link. The two faces are pressed together by a coiled spring, $g^4$, within the sleeve G', and the degree of this pressure can be regulated by the set-screw and nut $g^5$ on the arm $g'$. Any force, therefore, which presses these faces apart must be sufficient to overcome the tension of the spring. The cam-faces are so arranged that when the rake falls, as shown in Fig. 3, they must overlap each other; but in order to do this they must first overcome the tension of the spring, and when the rake is retracted the same operation must be repeated, but in a reverse direction. The rake consequently cannot rise from the platform without both overcoming the tension of the spring and lifting the slotted link. This device has proved of great utility in the harvest-field.

The arm $g$ can be raised or lowered, as desired, by inserting it in one of a series of holes in the guide-board H. As this change raises or lowers the center of motion of the link G, the throw of the rake is of necessity correspondingly varied. The backward movement of the link is arrested by a stop, $h$, on the guide-board H, and this stop likewise can be raised or lowered by a series of holes in the board H, as shown in Fig. 3.

The machine is drawn by a tongue, P, and is provided with a driver's seat, T, mounted upon a post, U, in such manner as to be easily adjusted backward or forward to balance the machine, as well as to accommodate the unshipping-gear of the rake, which likewise has to be adjusted to accommodate the raising and lowering of the machine.

As before remarked, the rake is thrown out of gear by moving pinion $d'$ endwise on its shaft, which is done by means of a forked lever, W, which embraces a collar on the neck of the pinion in the usual way, and is pivoted on an arm, X, projecting horizontally from the seat-standard U, as shown in Fig. 3. A link-rod, Y, connects this lever with a treadle, Z, pivoted to the foot-board V, Figs. 1, 2, 3, so as to be operated by the foot of the driver. The machine should likewise be provided with a suitable reel, I, dividers K, cutting apparatus L, and platform M, its outer end being sustained by a grain-wheel, N, mounted in an adjustable axis, so that it may be raised and lowered as required.

The operation of the rake is as follows: As the machine advances through the crop, the grain is pressed by the reel against the cutting apparatus, which severs it. The continued backward movement of the reel then lays it upon the platform. When enough for a gavel has accumulated, the driver lifts his foot from the treadle Z, the rake is thrown into gear and begins to move forward—say from the position shown in Fig. 1—and as it is held by the latch $g$ in the upper part of the slotted link, it is compelled to strike an arc of which the pivot $g'$ is the center. As the rake begins to descend upon the grain, its motion is accelerated, owing to the fact of the crank D' being then moving forward rapidly in the upper part of its revolution, and the weight both of the rake and crank-arm operates to bring it down rapidly. The rake passes behind and beneath the reel, and should be so adjusted as to strike with its teeth close to the finger-beam. In case the teeth strike with too much force, the tension-brake G must be screwed up, as hereinbefore described, so as to retract the rapidity of their fall. At the moment when the rake strikes the gavel, the crank D' is passing its forward dead-center. Consequently the rake pauses a moment at this point. The grain swept back by the reel during this pause falls upon the screen which separates it from that already upon the platform. The crank now begins to move backward rapidly, and the rake draws the grain endwise off the platform in the arc of a circle, and discharges it in a compact gavel behind the driving-wheel, and out of the way of the team in cutting the next swath, with its stalks nearly at a right angle to the path of the machine. As the rake strikes the platform, the latch $g$ opens by its own weight, as shown in Fig. 7, and leaves the rake free to move in the slotted link, which is held down by the friction-brake until the rake in its backward movement overcomes the tension of its spring and forces the cam-faces apart, as hereinbefore mentioned.

By reference to Fig. 2 of the drawings it will be noticed that as the rake moves back on the inner guard, H, it approaches the pivot of the link, and thus diminishes its leverage on the tension-brake, and consequently proportionately increases the force with which the rake is pressed down upon and prevented from overriding the grain. The rake in its backward movement of course turns the slotted link on its pivot until it resumes the position shown in Fig. 1, when the latch again closes behind the rake, and the operations before described are repeated.

One great advantage gained by my improvement is that the rake can be backed or propelled from any position it may occupy with equal facility, which is not the case with rakes of this class as heretofore constructed.

It is deemed unnecessary here to describe in detail the construction and operation of the other parts of the mechanism, as they form no part of the subject-matter herein claimed, and are, moreover, fully described in other applications filed simultaneously with this one, and respectively marked A, B, C, and D.

What I claim herein as new, and desire to secure by Letters Patent of the United States, is—

1. A vibrating slotted link or guide, which embraces the arm or stale of a vibrating sweep-rake and positively controls the movements of the rake, substantially in the manner and for the purpose described.

2. The combination of an automatic rake with a vibrating slotted link or guide and a gravitating stop-latch, substantially in the manner described, for the purpose set forth.

3. The combination of the rake-arm with the swiveling socket or collar $f$, substantially as described, for the purpose of varying the angle of the rake-teeth relatively to the platform, as specified.

4. Mounting a vibrating slotted link or guide (which positively controls the movements of an automatic rake) on an adjustable stud, $g'$, as described, for the purpose of varying the path of the rake, as set forth.

5. The combination of an automatic vibrating sweep-rake, a vibrating guide, and a tension-brake, for the purposes both of diminishing the force with which the rake strikes the gavel and of holding the rake down upon the gavel when raking off.

6. Driving an automatic rake through the center of the driving-wheel and from the outer side thereof, substantially as and for the purposes described.

7. The combination of the pinions $d\ d'\ d^3\ d^4$, as described, for the purpose of varying the speed of the rake, as set forth.

8. A tension-brake to regulate the force with which an automatic vibrating sweep-rake drops upon the platform.

In testimony whereof I have hereunto subscribed my name.

WM. F. COCHRANE.

Witnesses:
H. E. FOLGER,
GROVE W. GREEN.